(12) United States Patent
Kalinin et al.

(10) Patent No.: US 8,719,961 B2
(45) Date of Patent: May 6, 2014

(54) REAL SPACE MAPPING OF IONIC DIFFUSION AND ELECTROCHEMICAL ACTIVITY IN ENERGY STORAGE AND CONVERSION MATERIALS

(75) Inventors: Sergei V. Kalinin, Knoxville, TN (US); Nina Balke, Knoxville, TN (US); Amit Kumar, Oak Ridge, TN (US); Nancy J. Dudney, Knoxville, TN (US); Stephen Jesse, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 193 days.

(21) Appl. No.: 13/291,480

(22) Filed: Nov. 8, 2011

(65) Prior Publication Data
US 2012/0125783 A1  May 24, 2012

Related U.S. Application Data

(60) Provisional application No. 61/458,510, filed on Nov. 24, 2010.

(51) Int. Cl.
*G01Q 60/60* (2010.01)
(52) U.S. Cl.
USPC .................................. 850/51; 850/21; 850/33
(58) Field of Classification Search
USPC ................................................ 850/21, 33, 51
See application file for complete search history.

(56) References Cited

U.S. PATENT DOCUMENTS

| | | | |
|---|---|---|---|
| 5,877,891 | A | 3/1999 | Park et al. |
| 6,134,971 | A | 10/2000 | Misra et al. |
| 2006/0022197 | A1 | 2/2006 | Wirbeleit et al. |

FOREIGN PATENT DOCUMENTS

| | | |
|---|---|---|
| EP | 0517270 A1 | 12/1992 |
| EP | 0801310 A1 | 10/1997 |
| EP | 0928950 A2 | 7/1999 |
| WO | WO 2009-118164 A2 | 10/2009 |

OTHER PUBLICATIONS

Balke, et al ("Real Space Mapping of Li-Ion Transport in Amorphous Si Anodes with Nanometer Resolution," Nano Lett., vol. 10, 2010, pp. 3420-3425, published online Jul. 30, 2010).*
Balke, N. et al., "Investigation of Battery Materials Using Scanning Probe Microscopy," Boston, MA, 2009 MRS Fall Meeting, Nov. 30, 2009, 1 page.
Balke, N. et al., "Investigation of Thin Film Li-ion Batteries Using Scanning Probe Microscopy," Boston, MA, 2009 MRS Fall Meeting, Nov. 30, 2009, 1 page.
Balke, N. et al., "Nanoscale Mapping of Ion Diffusion in a Lithium-Ion Battery Cathode," Nature Nanotechnology, published online Aug. 29, 2010, pp. 1-6.

(Continued)

*Primary Examiner* — Michael Maskell
(74) *Attorney, Agent, or Firm* — Brinks Gilson & Lione

(57) ABSTRACT

A method and system for probing mobile ion diffusivity and electrochemical reactivity on a nanometer length scale of a free electrochemically active surface includes a control module that biases the surface of the material. An electrical excitation signal is applied to the material and induces the movement of mobile ions. An SPM probe in contact with the surface of the material detects the displacement of mobile ions at the surface of the material. A detector measures an electromechanical strain response at the surface of the material based on the movement and reactions of the mobile ions. The use of an SPM tip to detect local deformations allows highly reproducible measurements in an ambient environment without visible changes in surface structure. The measurements illustrate effective spatial resolution comparable with defect spacing and well below characteristic grain sizes of the material.

40 Claims, 13 Drawing Sheets

(56) References Cited

OTHER PUBLICATIONS

Balke, N. et al., "Real Space Mapping of Li-Ion Transport in Amorphous Si Anodes with Nanometer Resolution," Nano Lett., vol. 10, 2010, pp. 3420-3425.
Bullard III., J. W. et al., "Structural Evolution of the $MoO_3(010)$ Surface During Lithium Intercalation," Solid State Ionics, vol. 160, 2003, pp. 335-349.
Kalinin, S. V. et al., "Local Bias-Induced Phase Transitions," Materials Today, vol. 11, No. 11, 2008, pp. 16-27.
Koch, C. T. et al., "An Efficient, Simple, and Precise Way to Map Strain with Nanometer Resolution in Semiconductor Devices," Applied Physics Letters, vol. 96, 2010, pp. 091901-1-091901-3.
Morozovska, A. N. et al., "Electromechanical Probing of Ionic Currents in Energy Storage Materials," Applied Physics Letters, vol. 96, 2010, pp. 222906-1-222906-3.
Morozovska, A. N. et al., "Local Probing of Ionic Diffusion by Electrochemical Strain Microscopy: Spatial Resolution and Signal Formation Mechanisms," Journal of Applied Physics, vol. 108, 2010, pp. 053712-1-053712-21.
Qi, Y. et al., "In Situ Observation of Strains during Lithiation of a Graphite Electrode," Journal of the Electrochemical Society, vol. 157, No. 6, 2010, pp. A741-A747.
Yoshikawa, J. et al., "Real-Space Observation of Li Ions' Behavior in Li-Ion Batteries—Step Toward the Development of Positive Electrode Materials for High-Capacity Li-Ion Batteries," Asian Technology Information Program (ATIP) Newsletter, Aug. 24, 2008, pp. 1-4.
Search Report and Written Opinion of the International Searching Authority for EP Application No. PCT/US2011/060547 dated May 18, 2012, 8 pages.

\* cited by examiner

REAL SPACE MAPPING OF IONIC DIFFUSION AND ELECTROCHEMICAL ACTIVITY IN ENERGY STORAGE AND CONVERSION MATERIALS

PRIORITY CLAIM

This application claims priority to U.S. Provisional Patent Application No. 61/458,510, filed Nov. 24, 2010, the contents of which are incorporated by reference herein.

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

BACKGROUND

1. Technical Field

The present disclosure relates generally to measurement apparatuses and methods and, more particularly, to the qualitative and quantitative mapping of ionic diffusion, interfacial electrochemical process, and electrochemical activity in solids using scanning probe microscopy and related methods on the nanometer scale.

2. Related Art

Solid-state energy storage systems based on intercalation and reconstitution chemistries are key components of multiple energy technologies. For example, the electrochemical energy storage systems based on Lithium (Li)-insertion and reconstitution chemistries are a vital aspect of future energy technologies for implementation in areas such as mobile devices, electric and hybrid cars, and solar and wind power technologies. Similarly, polymeric, oxide, and other fuel cells form the basis of multiple power sources. Metal-air batteries are being developed as a high energy density storage systems rivaling traditional fossil fuels. Equally important are applications of ionic solids in information technologies, for applications such as memristive and electroresistive memories and logic devices. However, the capability for probing ionic transport on the nanometer scale remains a key challenge for the development and optimization of energy storage and generation systems, such as batteries, fuel cells, and electroresistive and memristive devices and precludes knowledge-based strategies for device development and optimization.

Existing solid-state electrochemical characterization methods for probing ionic motion typically utilize slow and large scale ion-conducting electrodes, thus limiting studies of ion transport to a scale of approximately ten micrometers or greater. This scale of resolution is well above nanoscale level necessary to map intercalation, chemical reactions, strain, charge, and ion transport at the level of single grain boundaries and dislocations in the electrodes. At the same time, techniques based on direct electronic current detection are sensitive to stray electronic currents and (for AC methods) stray capacitances, limiting information on ion motion. As a result of the absence of microscopic techniques for probing ionic motion and electrochemical reactivity, the fundamental mechanisms underpinning ionic process in solids ranging from batteries to fuel cells to electroresistive materials and devices remained largely unexplored.

Scanning probe microscopy (SPM) based techniques now provide high resolution imaging of various material properties of host compounds. Substantial efforts have been made to characterize the properties of electrochemically active storage materials at the nanoscale level using SPM based techniques. However, the application of SPM techniques for probing local ion and electron transport and electrochemical kinetics at various length scales of electrochemical systems, from micron-scale grain assembly, to the sub-micron grain, and the nanometer scale of individual structural and morphological defects, has been limited because of the well known limits on current detection. Further, standard current-based electrochemical methods have proven to be time consuming, and require protective atmospheres or in-situ operation, and offer limited or indirect information on electrochemical properties. Accordingly, these techniques are inadequate for a thorough and complete characterization of the local ionic properties of electrochemically active storage materials.

SUMMARY

Electrochemical processes in energy storage and conversion materials are typically linked with changes of molar volume of a host compound (chemical expansion). On the nanometer scale, additional bias-strain coupling mechanisms can become relevant, including deformation potential effects, space charge effects, and flexoelectricity. In accordance with an aspect of the disclosure, the strain-bias coupling mediated by an ionic motion or generally electrochemical process serves as a basis for detection of electrochemical phenomena in the nanoscale, and this approach is extended to include a family of spatially-resolved, voltage and time spectroscopic techniques. The method disclosed herein extends to measurement of electrochemical activity of both anionic and cationic species in a wide variety of materials, including battery materials, fuel cell materials, and the like, In one embodiment, a method of mapping activity on an electrochemically active surface of a material includes applying an electrical excitation signal to the material or device (global excitation). Movement of mobile ions of the material in response to the electrical excitation signal is detected locally by an SPM tip (local detection) and an electrochemical response of the material induced by the movement of the mobile ions is measured.

Under high frequency bias, where the frequency is well above inverse diffusion time for diffusion length comparable to tip size, the changes in the ionic concentration of a specimen are very small, often on the order of less than a fraction of 1%. Using lock-in amplification, band excitation or the equivalent of an amplification method, the inventors have developed a method for reliable measurement of ion mobility and electrochemical reactivity. To extend this measurement method to the low frequency domain (comparable to inverse diffusion time and below), for example, in accordance with an aspect of the invention, a measurement is made of the high frequency electrochemical strain signal, while applying a triangular voltage sweep. Measurement of the changes in ion motion during the voltage sweep is possible because the time of the voltage sweep is close to the diffusion time of the mobile ions.

An alternative method for measuring ion motion is made through direct time detection by applying a voltage pulse and observing how the signal relaxes with the voltage pulse. In this case, the measurement is correlated directly the diffusion time of the ions in the specimen, because the relaxation of the signal or the time change of the signal is controlled by how the ions redistribute in the specimen. With this approach, the dynamics of the change in the signal offers a reliable way to trace the ionic diffusion.

Accordingly, in another embodiment, a method of mapping activity on an electrochemically active surface of a ionic material includes applying a pulsed electrical excitation signal to a nanoscale volume of the material though a movable SPM probe (or nanoindentor, or other local probe technique) to induce movement of mobile ions in the nanoscale volume of the material (local excitation). The movement of the mobile ions causes lattice strain in the material and a vertical or lateral displacement, or both, of a nanoscale surface region of the material. The resultant displacement of an AFM microscope tip is measured as flexural and torsional components of cantilever displacement (or by an equivalent detection system), providing information on ionic activity below the probe.

In another approach, measurement of ion motion is made through a combination of time and voltage spectroscopy. For example, when ions in the specimen undergo an electrochemical reaction and diffusion, determination of ion motion is made by monitoring the changes in relaxation behavior as a function of a voltage pulse. Upon applying a short or small magnitude bias pulse, if there is no response, this indicates that there is no change in the electrochemical state of the specimen, because a reaction was not induced and no diffusion. Conversely, by applying a bias pulse that is sufficiently large to induce a reaction in the specimen, then a reaction is generated and ion diffusion will take place. Thus, the induced response evolves with time, enabling the relaxation in the volume of material below the tip to be probed. Accordingly, observing the response as a function of bias pulse and time, enables determination of the point at which the ion diffusion process is activated. This technique allows separate determination of ion mobility arising from both reactions and diffusion in the specimen.

In yet another embodiment, an apparatus that maps activity on an electrochemically active surface of a material includes a controller module configured to generate electrical excitation signals, where the excitation signals are applied to a nanoscale surface region of the material. The excitation signal can be a single frequency (sinusoidal) wave, multiple frequencies (with or without feedback to maintain resonance conditions), or a broad-band excitation signal. A probe in contact with the surface of the material is configured to detect intercalation of mobile ions, and interfacial or bulk electrochemical reactions through a vertical or in-plane (lateral) displacement of the nanoscale surface region of the material. A detector is coupled to the probe that measures the electromechanical response at the nanoscale surface region of the material based on the displacement of the mobile ions. The probe can be modified to include ion-specific coatings. The measurements can be performed in ambient, controlled gas, vacuum, or in liquid environments.

BRIEF DESCRIPTION OF THE DRAWING

The disclosure can be better understood with reference to the following drawings and description, including various embodiments which are illustrated in the color figures and illustrations, and associated descriptions filed herewith. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1A:
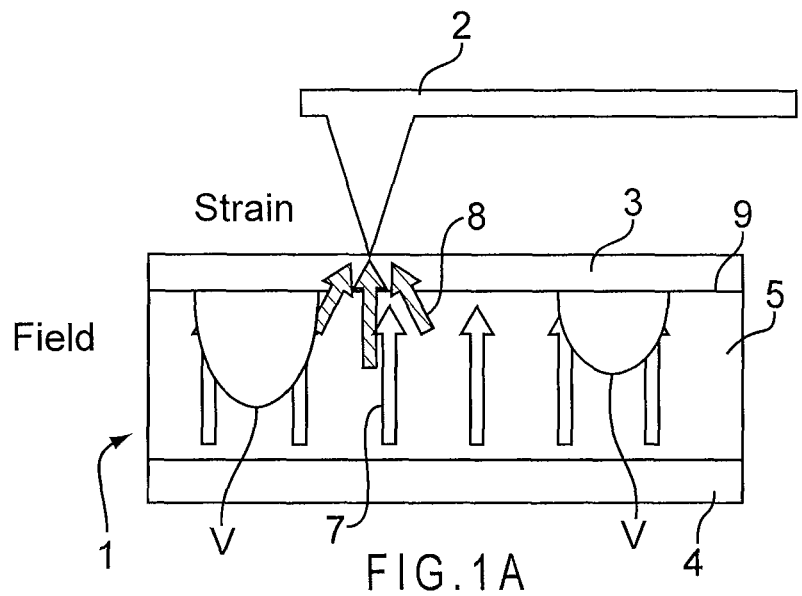
FIGS. 1A and 1B are schematic diagrams illustrating a probe tip contacting a specimen in accordance with exemplary embodiments of the disclosure.

The exemplary systems and methods described herein are related to various systems and methods that allow for the real space mapping of ionic diffusion and electrochemical reactivity in energy storage and conversion and electroresistive materials and devices based on SPM-based detection of local strains induced by ion transport (for example, diffusion or migration or both), and interfacial and bulk electrochemical processes. More particularly, the systems and methods may allow for the spatially resolved qualitative and quantitative measure of local ion dynamics on the nanometer scale through the detection of strain that is developed due to ion redistribution when electrical fields are applied to electrochemically active storage materials. The methods described herein may be universally applied to study of cationic and anionic motion at the nanoscale volume level with high resolution in energy storage and generation systems such as, but not limited to, Li-ion batteries, oxygen-containing fuel cells, and electroresistive and memristive devices.

The specific embodiments described herein relate to the methodology employed to enable real space mapping of ionic diffusion and electrochemical reactivity in Li-ion batteries and in oxygen-ion conductive solid surfaces. In one aspect of the disclosure, the oxygen reduction/evolution reaction phenomena on oxygen-conductive surfaces is mapped on the scale of several nanometers, well below the limit of micro-contact measurements. This allows for direct identification of local electrochemical reactivity and providing insight into local kinetic parameters. In another aspect Li ion electrochemical activity is mapped in a Li ion battery material.

In accordance with the disclosure, bias-induced ionic dynamics including both transport and reactions are determined in a nanoscale surface region of a specimen through bias-induced volumetric changes are determined within a very small portion of the specimen. The mobile ion electrochemical activity in such extremely small volumes of a specimen is detected and measure through contact of a surface of the specimen with an SPM probe. The SPM probe has a tip that is extremely small and is capable of detecting very small changes in the surface of a material in contact with the probe tip. In accordance with the disclosure, a method and an apparatus for performing the method are described in which a quantitative measure of local ion dynamics on the nanometer scale is carried out through the detection of strain by means of contact with an SPM probe tip. The strain in the material in contact with the probe is developed as a result of electrochemically-induced ion redistribution (either transport or reaction) when electrical fields are applied to an electrochemically active material. This technique is defined herein as electrochemical strain microscopy (ESM). To enhance the performance of the probe tip, the tip can be coated with a solid electrolyte that is sensitive to a specific mobile ion. For example, the probe tip can be coated with a cation-containing electrolyte, such as a Li or Na-containing electrolyte or other anion, or a anion-containing electrolyte, such as an electrolyte including oxygen, fluorine, hydroxyl, and the like.

In one exemplary embodiment, a high-frequency period voltage bias is applied between the cathode and the anode electrodes of a specimen, such as battery electrode material, and the SPM probe acts as a passive probe of the local periodic surface displacement generated by the ion redistribution and the associated changes in the molar volume of the specimen. In another exemplary embodiment, the (SPM) tip concentrates a periodic electric field in a nanoscale volume of material. In either method, the associated changes in molar volume result in local surface expansion and contraction, or lateral motion, or both that is transferred to the SPM probe and detected by microscope electronics coupled with the probe. In accordance with an aspect of the disclosure, the extremely measurement high sensitivity of dynamic SPM, potentially on the order of at least about 1 picometer and including, for example, a range of about 3 to about 10 picometers, enables the detection of ion concentration changes on the order of 10% in 300 $nm^3$ volumes for typical values of chemical expansivity (Vegard) coefficients.

FIG. 1 schematically illustrates the two methods described above. In FIG. 1A, a specimen 1 is subjected to analysis by an SPM probe 2. A pulsed voltage is applied to electrodes 3 and 4 to impart a periodic electric bias to an electrochemically active material 5. An electric field 7 is set up in electrochemically active material 5 causing mobile ions to undergo chemical reactions with atoms making up the grain structures within the material 5. These reactions lead to changes in a nanoscale volume V of material 5 creating a strain force 8 that causes surface 9 of material 5 to deform. The surface deformation is detected by SPM probe 12.

Figure 1B:
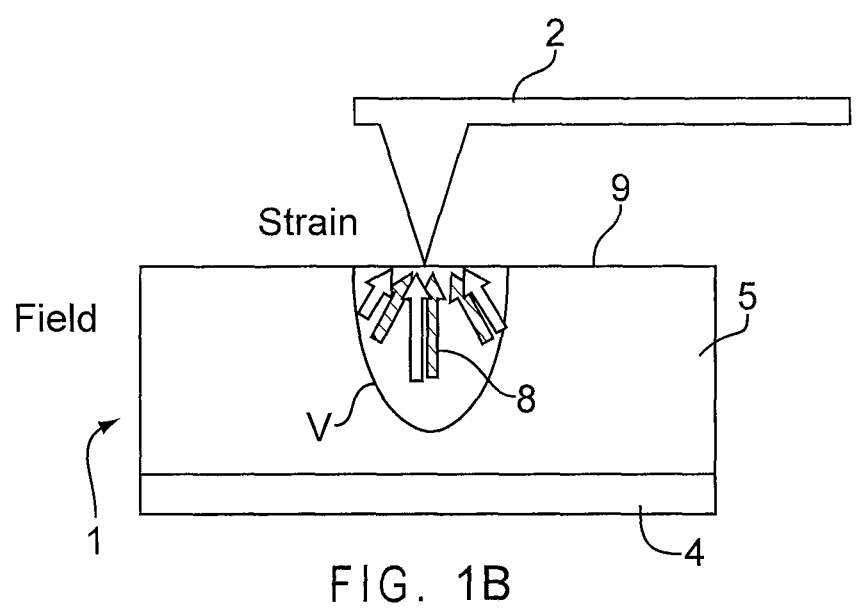

FIG. 1B illustrates the alternative embodiment in which the SPM probe 2 generates a periodic electric field in a nanoscale volume V of material 5. SPM probe 2 detects strain force 8 in the nanoscale volume V as a vertical or lateral, or a combined vertical and lateral displacement of surface 9. The volumetric changes are created by the chemical reactions and transport of mobile ions in the nanoscale volume.

Figure 2:
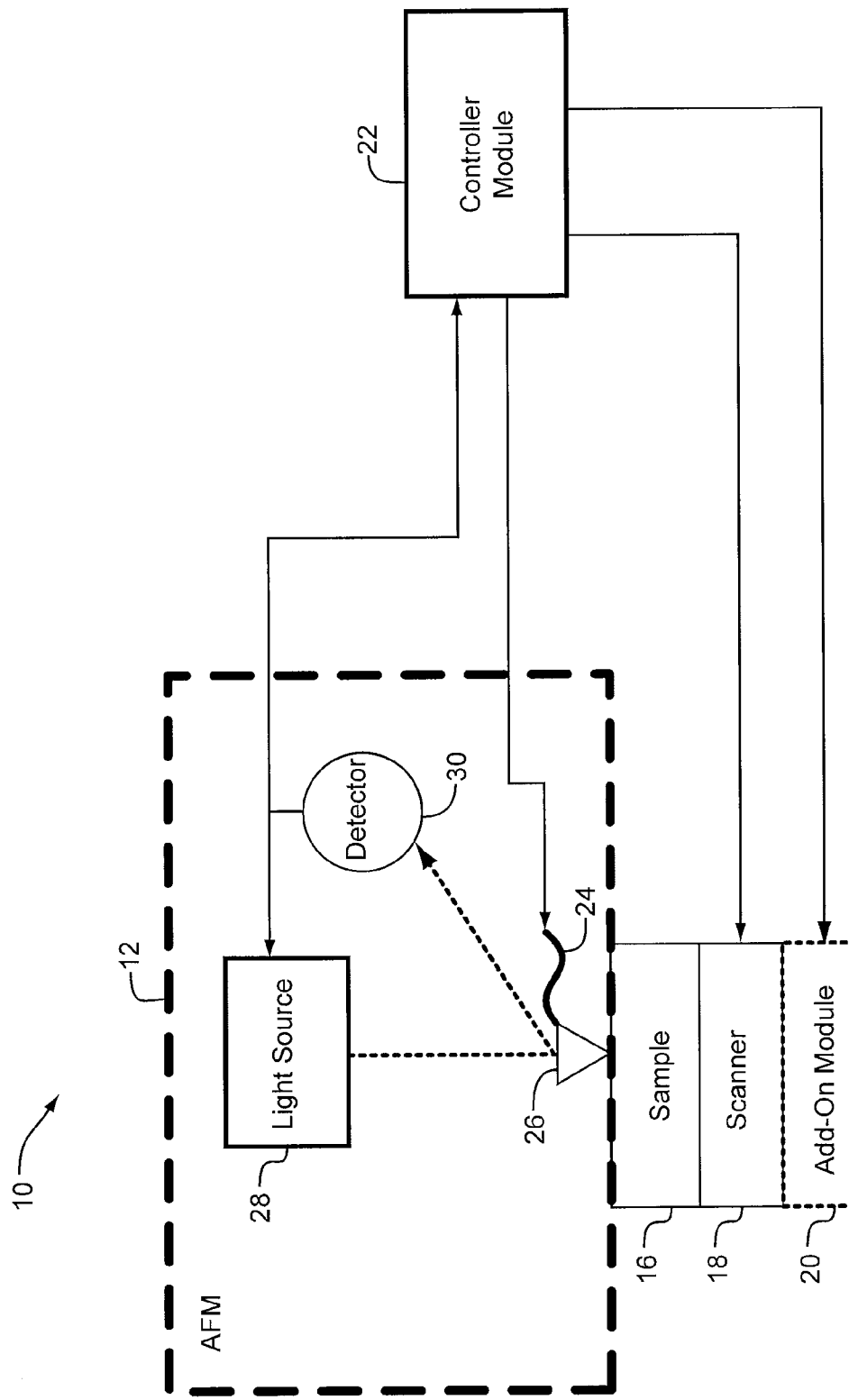
FIG. 2 illustrates a functional block diagram of an exemplary atomic force microscopy (AFM) system in accordance with an embodiment of the disclosure.

FIG. 2 illustrates an exemplary scanning probe microscopy (SPM) system 10 that implements an electrochemical strain microscopy (ESM) method of the present disclosure. The ESM method is based on the application of a high-frequency periodic electric bias between an anode and a cathode of a Li-ion thin film battery. A lock-in technique or equivalent is used to determine an oscillatory surface displacement on top of the Li-ion thin film battery. The amplitude of the surface oscillations may be directly related to the concentration changes of Li ions that is induced by the applied electrical bias ($V_{ac}$) in small material volumes. A relationship between a local lattice parameter and the Li ion concentration within a thin film battery is defined by the Vegard tensor, or by defining the dependence of molar volume compounds on ion concentration. The amount of bias-induced Li-ion flow is determined both by Li-ion migration (field driven) and diffusion (concentration driven migration), both of which are essential for battery functionality.

The alternative modes of excitation can include, but are not limited to the multifrequency (for example, two or more) at the fixed frequency, multiple frequency excitations with the use of the feedback loop to maintain resonance conditions, frequency sweeps at each spatial/voltage location, and broad band excitation (band excitation) without or with feedback. These alternative excitation methods are used to ensure the imaging at the cantilever resonance (or adjusting driving frequency for variations in contact resonance frequencies along sample surface). Imaging at the resonance is preferred, but is not a required mode of ESM.

SPM system 10 includes an atomic force microscopy (AFM) system, although other SPM implementations may be used. In one embodiment, SPM system 10 includes an AFM 12, a sample 16, a scanner 18, and an add-on module 20, shown in phantom. AFM 12 may be any of a number of commercially-available AFM systems, or equivalent instrumentation, such as, for example, a nanoindentor or a profilometer, or the like.

Cantilever 24 is equipped with a probe tip 26, referred to simply as a "tip." AFM 12 further includes a light source 28 such as a laser diode that generates a beam of light that is directed towards cantilever 24 and reflected toward a detector 30, such as, for example, a four-quadrant photodetector. In accordance with an aspect of the disclosure, the reflected beam contains information regarding the deflection undergone by cantilever 24. AFM system 10 may include additional components, such as additional circuitry, firmware and/or processing modules. Portions of AFM system 10 may be implemented by one or more integrated circuits (ICs) or chips. Furthermore, controller module 22 and add-on module 20 may respectively include one or more modules or components.

Figure 3A:
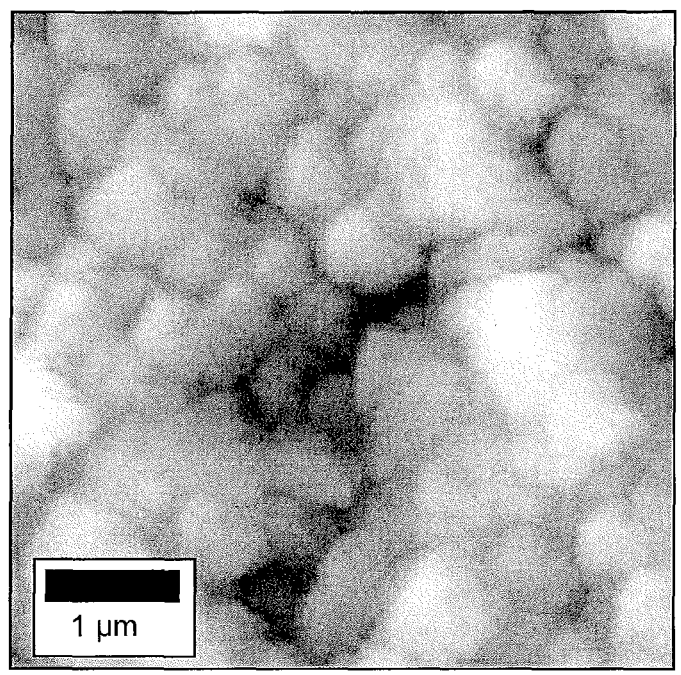
FIG. 3A depicts the topography of the polycrystalline $LiCoO_2$ surface of a $LiCoO_2$ sample.
Figure 3B:
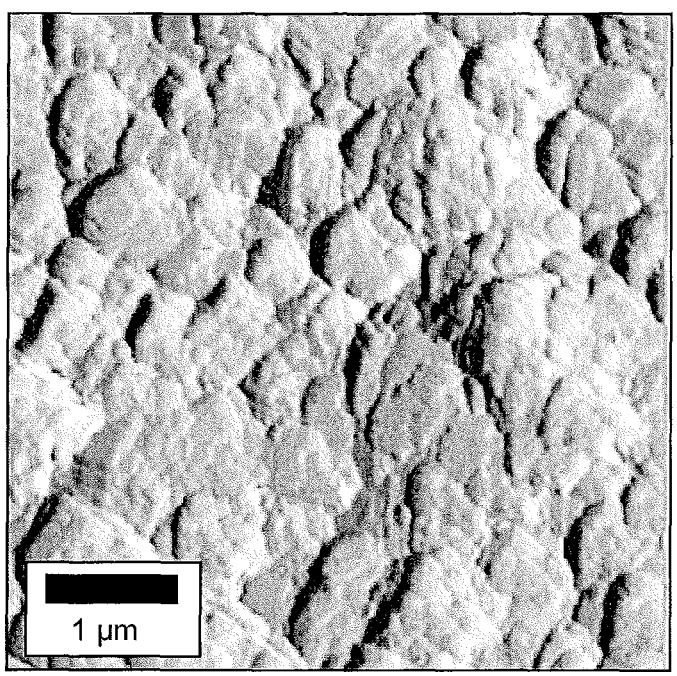
FIG. 3B depicts the deflection images of the polycrystalline $LiCoO_2$ surface of FIG. 2A using the probe tip of the system illustrated in FIG. 1.
Figure 3C:
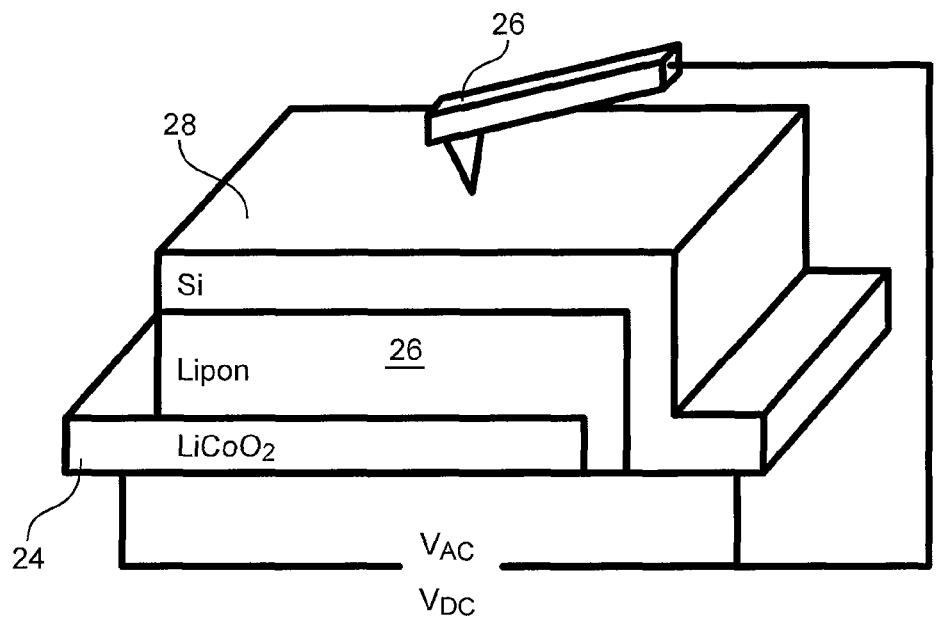
FIG. 3C is a schematic drawing of the electrical connection of the probe tip in contact with a sample.

FIG. 3A depicts the topography of the polycrystalline $LiCoO_2$ surface of sample 16. FIG. 3B depicts the deflection images of the polycrystalline $LiCoO_2$ surface using the tip. FIG. 3C illustrates a schematic drawing of the electrical connection of the tip in contact with sample 16. In the present embodiment, sample 16 includes an all-solid thin-film Li-ion battery test structure including a layered $LiCoO_2$ bottom cathode 24, a lithium phosphorous oxynitride (UPON) electrolyte 26, and a top amorphous Si anode 28, all of which are deposited on a Au/Ni-coated $Al_2O_3$ substrate (shown in FIG. 9). Layered $LiCoO_2$ is widely used as a cathode material in rechargeable lithium ion batteries and is relatively stable when in contact with ambient and aqueous environments.

Figure 3D:
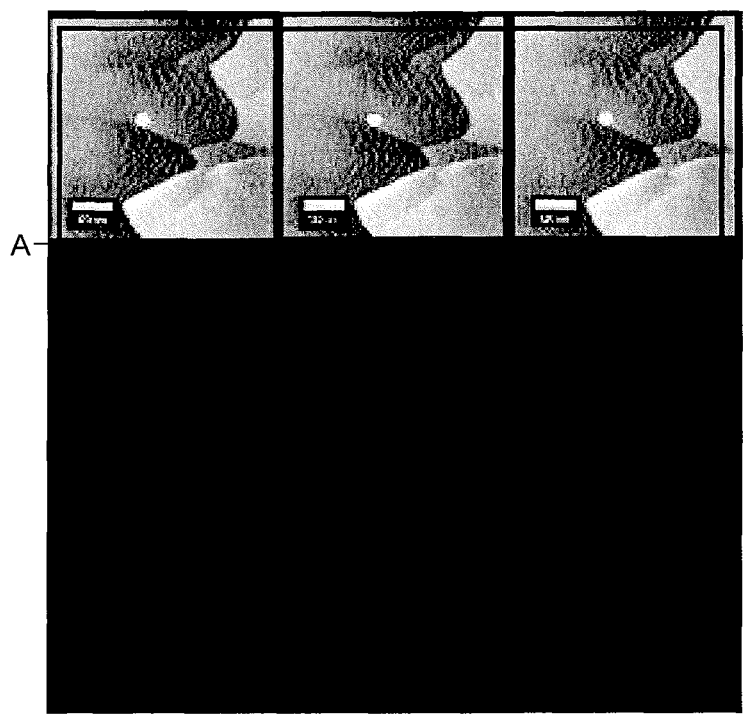
FIGS. 3D and 3E illustrate deflector images of the $LiCoO_2$ surface showing the affect of a bias pulse to control local lithium concentration within the polycrystalline $LiCoO_2$ surface, in accordance with an embodiment of the disclosure.
Figure 3E:
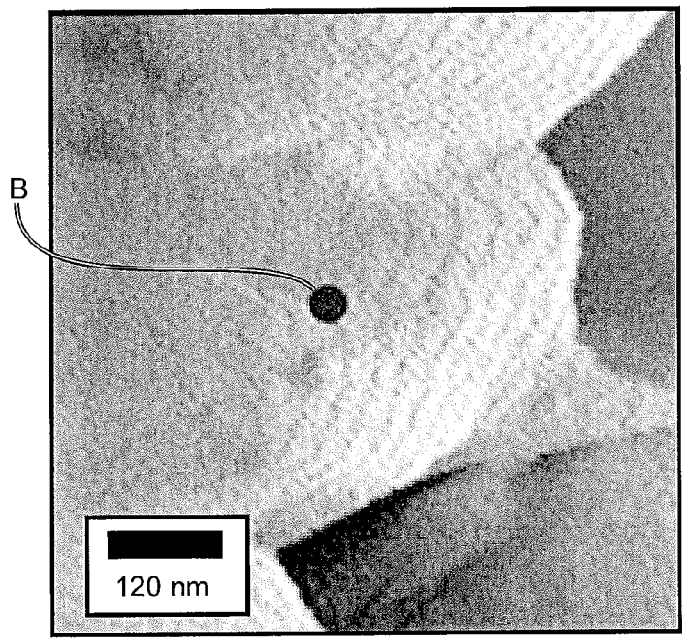

Through the images illustrated in FIGS. 3D and 3E, the utilization of a bias pulse to control local lithium concentration within the polycrystalline LiCoO$_2$ surface in accordance with the disclosure can be visualized. FIG. 3D illustrates a cantilever deflection image of the LiCoO$_2$ surface prior to the application of several approximately 2-ms bias pulses of approximately 12 Volts to the stationary tip 26 (shown in FIG. 6).

Tip 26 is positioned at a single point A in contact with the LiCoO$_2$ surface in an area where step edges are present within sample 16. The AFM measurements described in the present disclosure were performed with tip 26 in direct contact with the LiCoO$_2$ surface in air atmosphere and without any additional protective coating.

Figure 6:
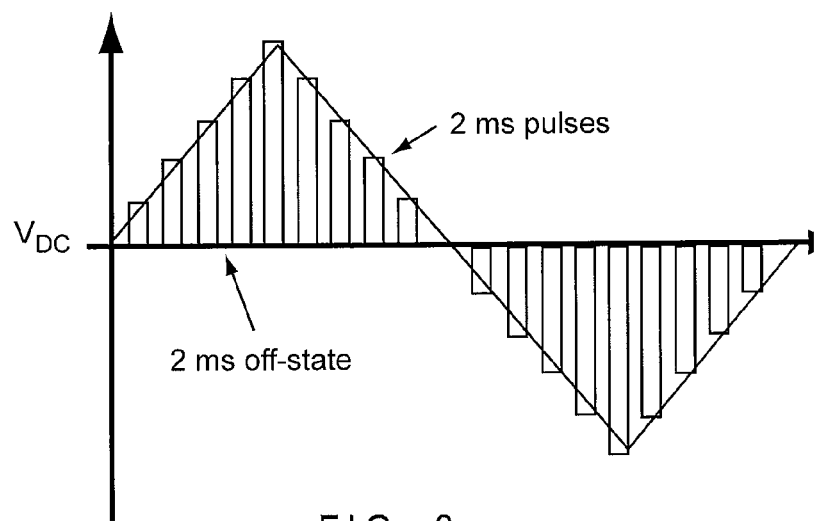
FIG. 6 is a plot of a voltage pulse over a 2 ms time interval application to the sample of FIG. 3C.

Referring to FIG. 3E, this image illustrates the cantilever deflection image of the LiCoO$_2$ surface after the application of the approximately 2-ms bias pulses (FIG. 6). In comparing FIG. 3E and FIG. 3D, the topography of the LiCoO$_2$ surface at point B in FIG. 3E has changed relative to point A of FIG. 3D. This topography change indicates that a variation in material volume occurred as a result of a change in lithium concentration in the material following the application of the bias pulses. As seen in FIGS. 3D and 3E, the step edge geometry of the LiCoO$_2$ surface remained substantially invariant prior to and after the application of the approximately 2-ms bias pulses. The comparative images illustrated in FIGS. 3D and 3E demonstrate the affect of applying local, short, high-voltage pulses that are well above the equilibrium redox potentials, to the LiCoO$_2$ surface (in particular the cathode material) of sample 16. In accordance with an aspect of the disclosure, the induced electrochemical activity of the Li ions, caused by the intercalated or de-intercalated lithium ions in the sample, enables the detection of molar volume changes and deformation of the LiCoO$_2$ surface. Accordingly, the redistribution of lithium ions permits the quantitative mapping of ionic drifting and electrochemical activity in this class of materials using an SPM technique.

EXAMPLE I

High Frequency Excitation Method

In one embodiment, a high-frequency periodic voltage Vac is applied to the tip to measure ionic currents resulting from the local redistribution of lithium ions at the LiCoO$_2$ surface (indicated as V$_{AC}$ in FIG. 3C). As previously described, the electric field generated by the application of the periodic voltage V$_{AC}$ alters the local electrochemical potential of the lithium ions within the LiCoO$_2$ surface of sample 16. The application of the periodic single frequency, multiple frequency, or band excitation voltage V$_{AC}$ changes the local concentration of the lithium ions, causing the lithium ions to diffuse through the solid, which changes the lattice volume of the LiCoO$_2$ surface at a contact region or area between tip 26 and the LiCoO$_2$ surface ("tip-surface contact").

In the demonstrated embodiment using the band excitation method, the use of a resonance enhancement technique enhances the sensitivity by a factor of approximately 30 to approximately 100. AC voltages of varying frequencies are applied using a band excitation method to take advantage of the contact resonance enhancement. The AC voltage frequency can range from about 1 kHz to about 10 MHz and including smaller ranges, for example, about 300 kHz to about 400 kHz. The tip-surface contact may be characterized as a harmonic oscillator having a resonant frequency determined by the Young's modulus of LiCoO$_2$ and the contact area between tip 26 and sample 16. An amplitude of the resonance of the surface displacement at the tip-surface contact corresponds to the lithium ion mobility under the influence of an electric field. Based on the utilization of a lock-in technique or its equivalents, the resonant amplitude of the surface displacement, measured in nanometers, may be determined, which yields information about the local bias-induced lithium concentrations and thus the lithium transport in the LiCoO$_2$ surface.

The mathematical description for the tip-surface phenomena can be developed for several simplified cases. In the following description, it is assumed that the lithium ion transport processes are diffusion-limited and that the contribution of ion migration is minimal. In this case, the amplitude of the oscillating surface displacement u$_3$, in units of distance, is (in the high frequency regime) represented by Equation (1):

$$u_3 = 2(1+v)\beta \frac{V_{ac}}{\sqrt{\omega}} \cdot \frac{\sqrt{D}}{\eta} \quad 1)$$

where V$_{ac}$ is an alternating current (AC) voltage amplitude, D is the lithium diffusion coefficient, and the linear relation between an applied field and chemical potential is described by η. The coefficient β is an effective Vegard coefficient that expresses an approximate and empirical linear relationship between lattice size and lithium concentration.

Figure 4A:
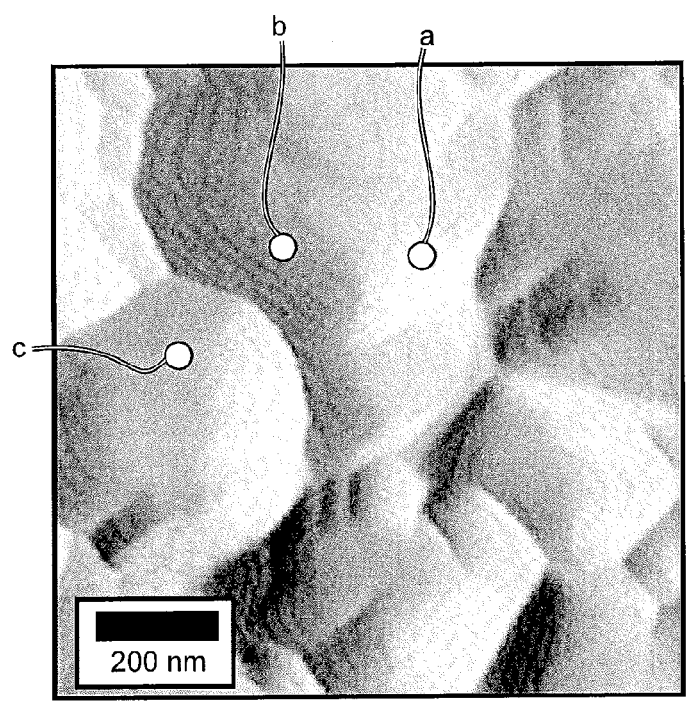
FIG. 4A illustrates an exemplary map of the $LiCoO_2$ surface illustrated in FIG. 2A.
Figure 4B:
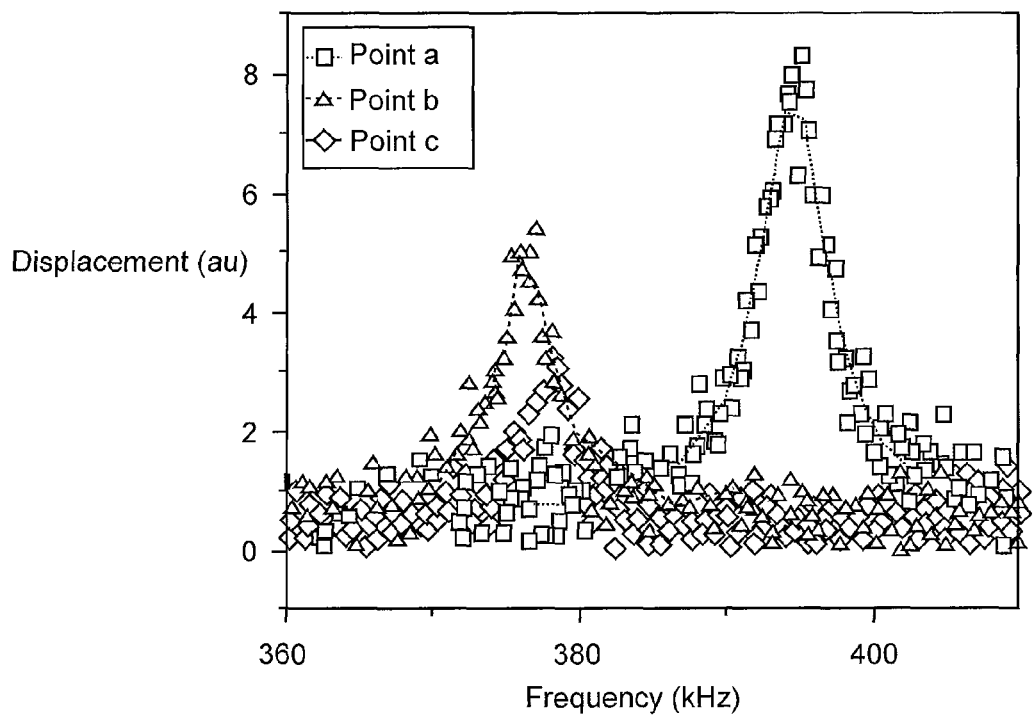
FIG. 4B depicts measured contact resonance peaks resulting from an AC bias of a voltage applied to the tip at the different locations illustrated in FIG. 3A, in accordance with an embodiment of the disclosure.
Figure 4C:
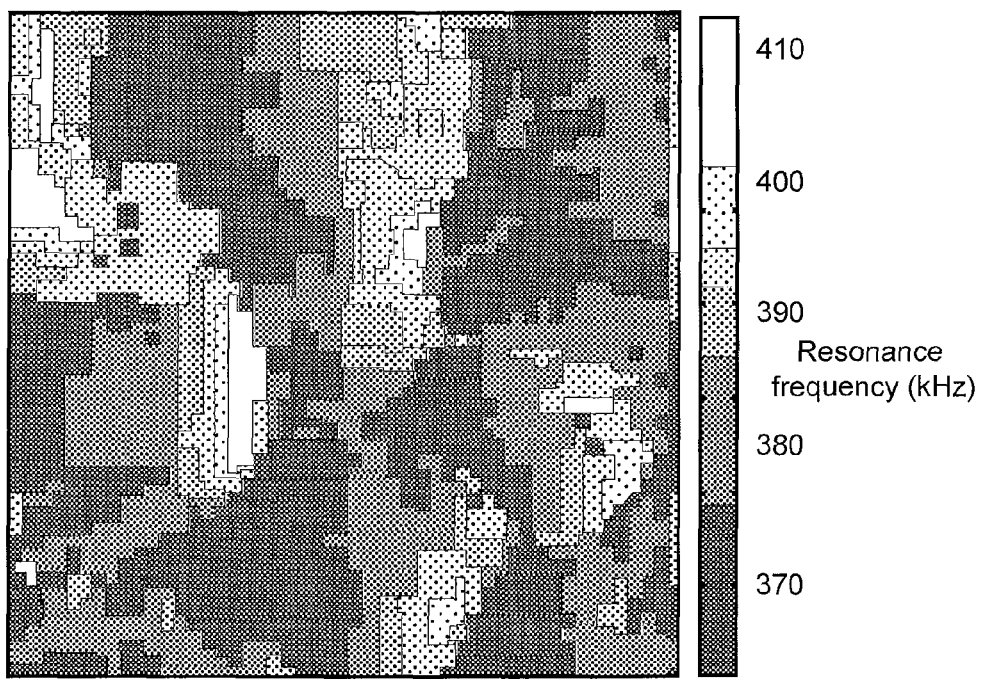
FIG. 4C illustrates the spatial distribution of the resonance frequencies on the surface of a sample.
Figure 4D:
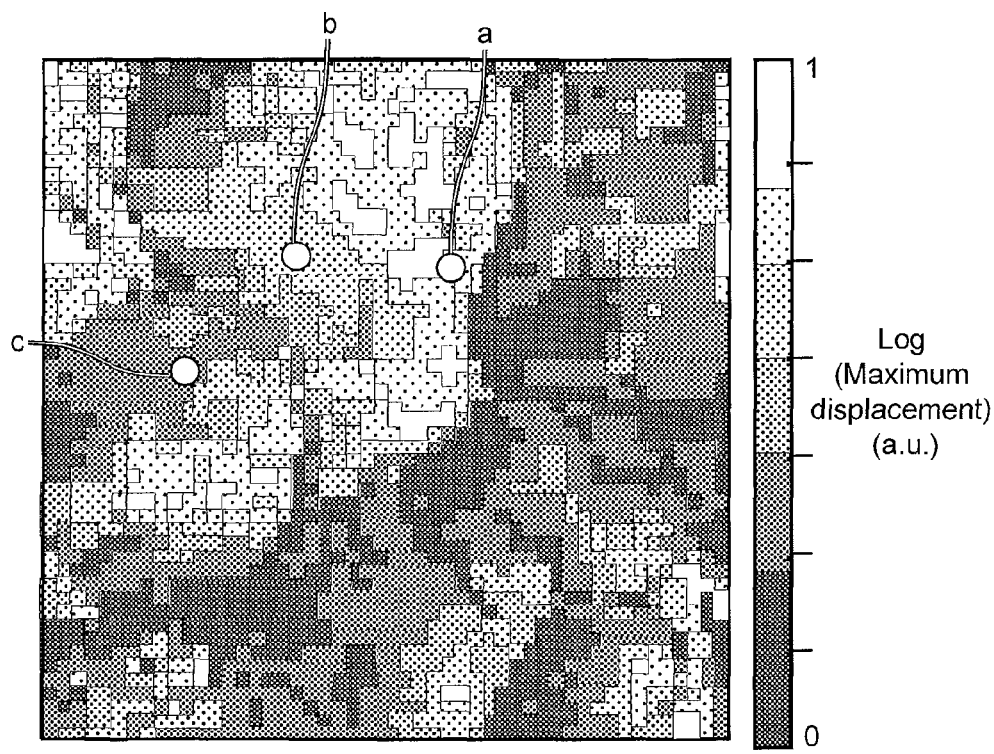
FIG. 4D illustrates a spatial map of resonant amplitude indicative of regions of dissimilar response of the $LiCoO_2$, in accordance with an embodiment of the disclosure.

Referring to FIGS. 4A to 4D, an exemplary map of the LiCoO$_2$ surface is shown. FIG. 4B depicts the measured contact resonance peaks resulting from an AC bias of approximately 1 V (peak-to-peak) applied to tip 26 at the three locations designated as circles "a", "b", and "c," shown in FIG. 4A. FIG. 4C illustrates the spatial distribution of the resonance frequencies on the surface of sample 16. The spatial distribution is indicative of a strong systematic variation that reflects changes in the effective Young's modulus for the different grain orientations and surface topography variations. FIG. 4D illustrates a spatial map of resonant amplitude indicative of regions of dissimilar response of the LiCoO$_2$. In other words, the spatial map illustrates variations in lithium diffusion and intercalation behavior based on the high-frequency excitation at the three locations a, b, and c.

EXAMPLE II

Electrode Bias Voltage

Figure 5:
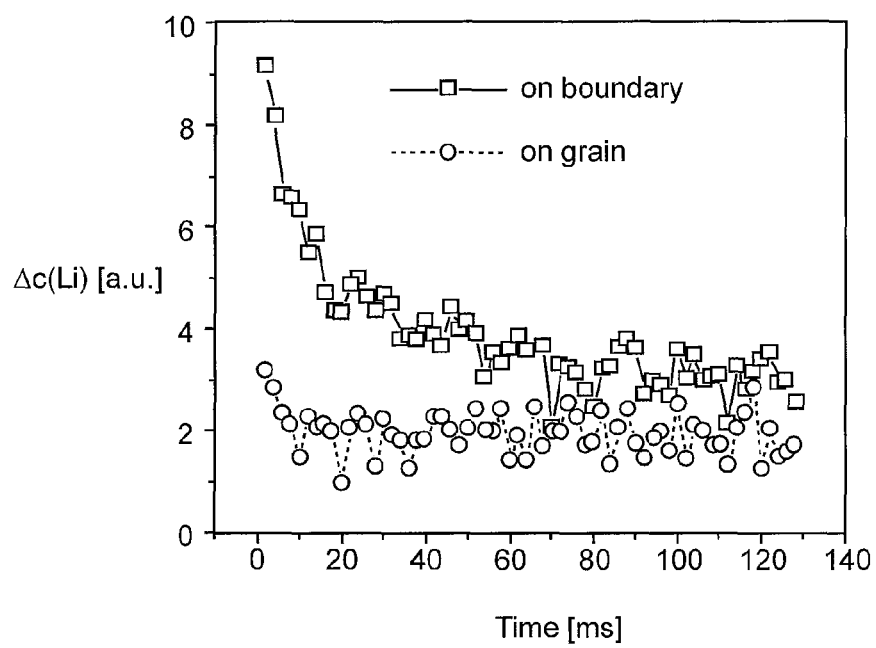
FIG. 5 is a plot of Li ion concentration versus time for two locations in the sample of FIG. 3C.

Li ion concentration was investigated SPM probe analysis at a grain boundary and in at a location away from the grain boundary of sample 16 (polycrystalline LiCoO$_2$) shown in FIG. 3C. FIG. 5 illustrates the change in Li ion concentration measured consecutively in two different locations on the anode surface following the application of a voltage pulse having an amplitude of −18 V and a length 30 ms. To minimize electrostatic effects and reactivity at the tip—surface junction, the pulse was applied to the cathode (the bottom electrode) of the battery with the anode (top electrode) grounded. The pulse length was set in the millisecond range in order to minimize the changes in the charge state of the battery during imaging and to keep the measurement time of a single point sufficiently low to enable mapping on spatially resolved grids with a large number of sampling points. To induce a measurable Li-ion flow with the millisecond voltage pulses, the applied pulse amplitudes were much higher than typical battery operation voltages. However, the battery showed no signs of damage (such as rapid irreproducible changes and slow drifts in the ESM image contrast, visible surface damage), since the millisecond pulses are also much shorter than possible decomposition reaction kinetics.

If the measurement is performed locally by the SPM probe at a boundary-like feature, the ESM response is increased after the voltage pulse and decays with a relaxation time on the order of about 100 ms. The relaxation is directly related to the redistribution of the Li ions by diffusion transport, since the measurements are performed in the zero-field state, following the initial voltage pulse. Assuming the diffusion coefficient for a Li-ion is about $10^{-14}$ to $10^{-12}$ $m_2$/s, the length scale over which Li-ions diffuse during 100 ms can be about 30-300 nm, which is consistent with the signal generation volume for SPM.

To study the bias-dependent Li-ion flow at each spatial location, in this voltage spectroscopy method, a slowly varying (~1-10 Hz) DC bias $V_{DC}$ was applied between the cathode and anode in form of voltage pulses of 2 ms lengths and up to ±15 V amplitude. The saw tooth voltage pulse is shown in FIG. 6. After each bias pulse the Li-ion distribution was probed by applying 1 $V_{AC}$ to the battery during the bias-off state. In this manner, the Li-ion flow on the time scale of the waveform (about 0.1-1 s) is probed through the changes of the ESM response. Similar to the pulse experiments, the time scale of the DC sweep is chosen such that corresponding Li-ion diffusion length is comparable to the effective tip size, hence providing an optimal compromise between spatial resolution and signal strength. This time scale is also compatible with spectroscopy mapping, where the data is acquired over a grid of points over the sample surface. The advantage of using positive and negative voltages (with zero time-average) is that the Li redistribution due to voltage pulses is (at least partially) reversible and the overall Li profile within the material remains almost constant.

The measured ESM response during the bias sweep show hysteretic behavior, and the mechanisms for hysteresis loop formation can be qualitatively understood from the relaxation curve in FIG. 5. If the application of the bias pulse of given amplitude does not result in Li-ion redistribution, or the induced relaxation is much faster than the time interval of the measurements in the bias-off state, the ESM signal remains constant (horizontal line). Another explanation is the total lack of Li ions in the probed volume. If the relaxation time is larger than the time between the voltage pulse and the measurement, the hysteresis loop opens up. The area under the loop is directly proportional to the changes in Li-ion concentration induced during the voltage cycle, and hence can be used to investigate the Li-ion motion in amorphous Si under the influence of an electric field.

EXAMPLE II

Electrode Bias Voltage

Figure 7A:
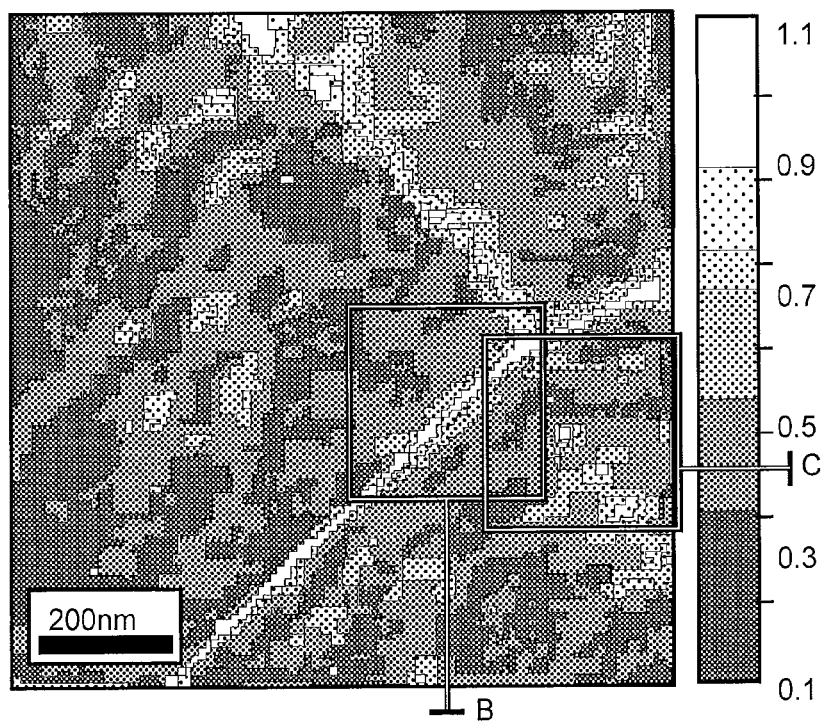
FIG. 7A illustrates a spatial map of a displacement loop in the sample of FIG. 3C measured with $15V_{DC}$ bias.

To map spatially resolved Li-ion flows, ESM loops with $V_{DC}$=±15 V and 7 Hz frequency were measured on a 100×100 grid over a 1 μm by 1 μm area of sample 16. The loop opening at 0 $V_{DC}$ associated with hysteresis of the strain response, was chosen as a convenient measure of the Li-ion flows into or out of the region under the probe during the voltage sweep. The higher the loop opening, the larger amount of Li-ions re distributed by the electric field, indicative of either higher Li-ion concentration or a higher ionic mobility. FIG. 7A clearly shows the highest hysteretic response at the sharp boundary feature. In addition, strongly enhanced Li-ion flow on the smoother boundary and a number of "hot spots" not associated with visible topographic defects are clearly seen. The observed behavior is highly reproducible and the high resolution maps acquired in the areas marked B and C in FIG. 7A of the scan are shown in FIGS. 7B and 7C, respectively.

Figure 7B:
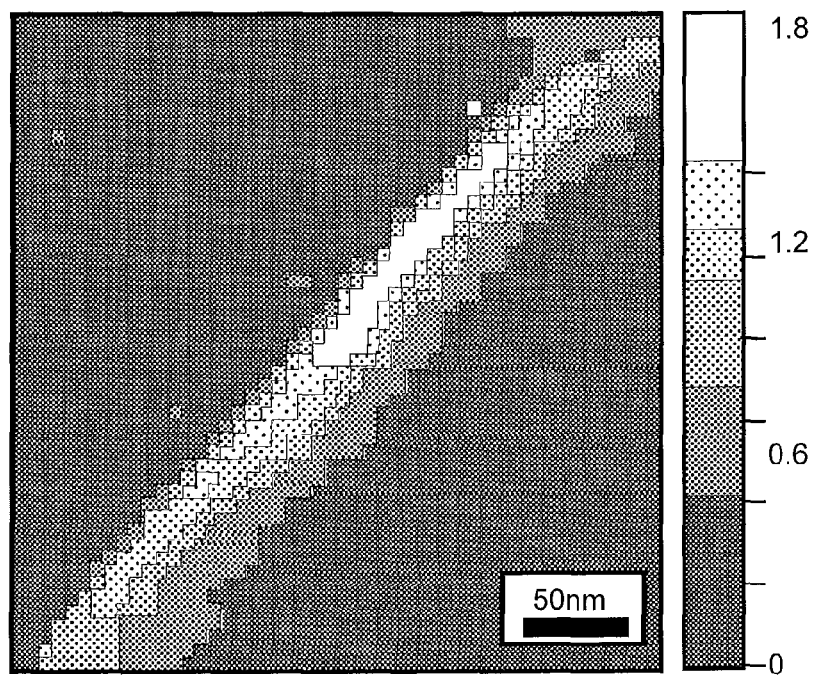
FIGS. 7B-7C illustrate expanded view of the spatial map of FIG. 7A.
Figure 7C:
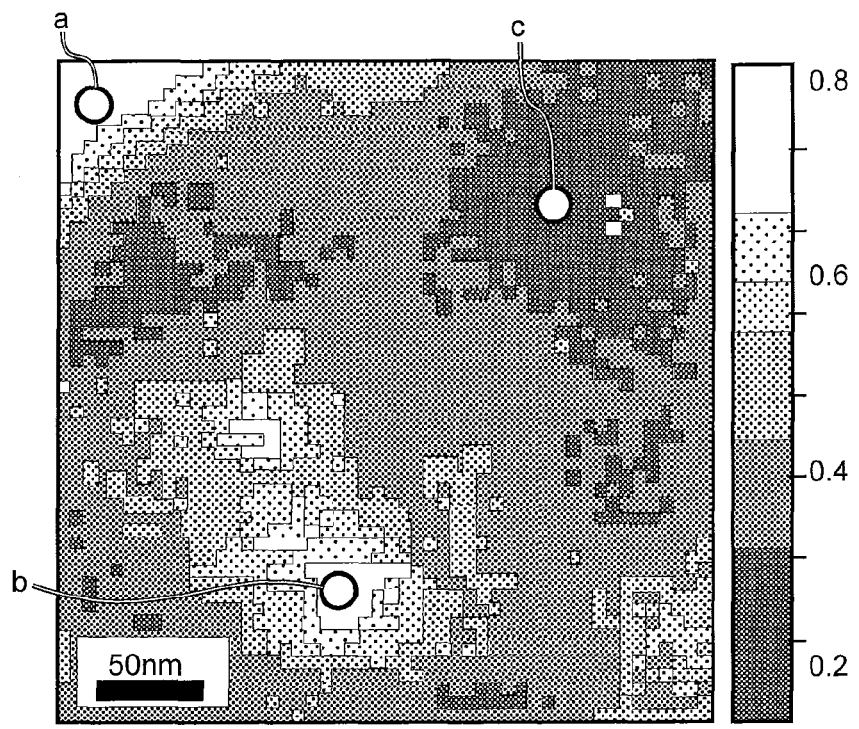
Figure 8:
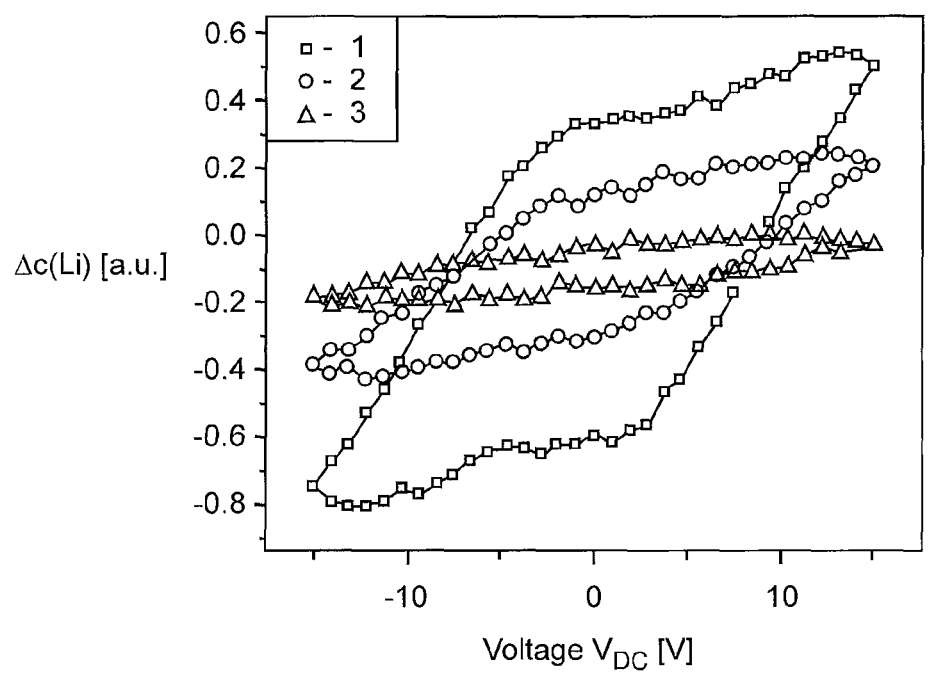
FIG. 8 is a plot of extracted displacement loops of three areas designated in the map of FIG. 7C.

The maps of FIGS. 7A-7B illustrate a 300 nm scan size with 6 nm grid size and show that the observed contrast (hot spots within columnar grains) are measured reproducibly and that the loop opening is not homogeneous along the boundaries, providing information on Li-ion conduction channels on the nanometer scale. FIG. 8 shows extracted displacement loops from the three different areas indicated by the circles in FIG. 7C. Circle "a" indicates the boundary, circle "b" indicates a hot spot area within the grain, and circle "c" indicates a low-response region.

The very sharp boundary features of the order of 20 nm lateral size suggests that the signal generating strain is very close to the surface. If the strain would be generated at the LiPON/Si interface, the measured strain on top of the Si layer would appear diffuse, on the length scales of the film thickness (except for the case of film formed by mechanically isolated columns, which is clearly not the case here). A number of possible explanations exist for the origins of the observed sharp contrast at the topography minima. For example, a higher amount of Li-ions in the sharp boundary regions can be explained by topographic field enhancement induced by the roughness of Si-LiPON interface.

Amorphous Si films can exhibit a network of low density regions forming channels through the film. These low-density channels may offer a preferred or hindered Li conduction path. The ESM data identifies the high-contrast regions as those at which Li-diffusion times are comparable with the experimental time, while zero contrast in grains can be attributed both to much higher and much lower diffusion times, or the lack of Li-ions. Alternatively, the mismatch in the electric conductivity between low- and high-density material can lead to the electric field enhancement at the topography minima, stimulating the one-dimensional electromigrative transport through the Si. Finally, the stray reactions at the tip-surface junction cannot be completely excluded (however, this model does not offer any explanation for the formation of hot-spots not associated with any topographic features).

EXAMPLE III

Electrode Bias Voltage

Further insight into the origins of ESM contrast and nanoscale mechanisms of battery functionality can be obtained from the ESM hysteresis evolution during long-term spectroscopic imaging. Here, repeated measurements (cycling at 7 Hz with ±15 $V_{DC}$) over prolonged intervals have shown that the observed ESM hysteresis slowly evolve with time. The systematic study of the influence of cycling on the local displacement loops was performed on a pristine battery sample. Voltage spectroscopy maps were taken after different numbers of sinusoidal cycles (7 Hz, 15 V amplitude) up to $6 \times 10^5$ cycles.

Figure 9A:
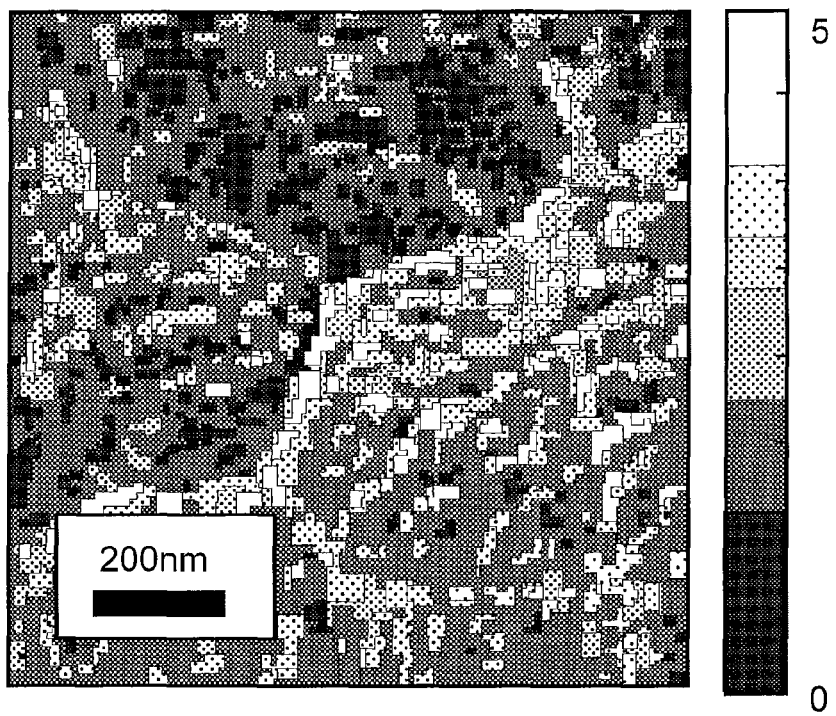
FIGS. 9A-9D illustrate a spatial map of a displacement loops resulting from Li ion flow upon repeated cycling of a high-frequency bias of the sample of FIG. 3C.
Figure 9B:
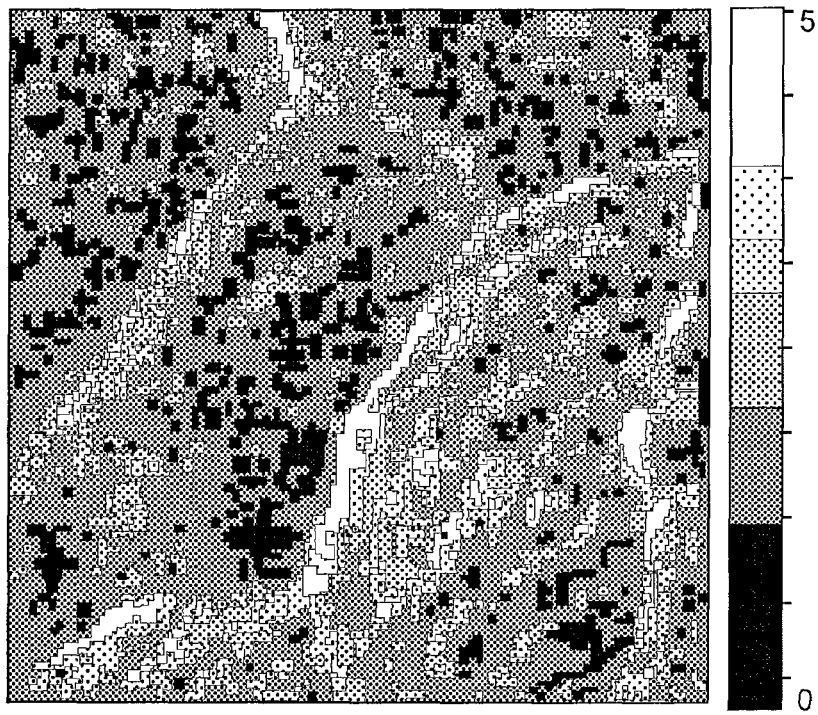
Figure 9C:
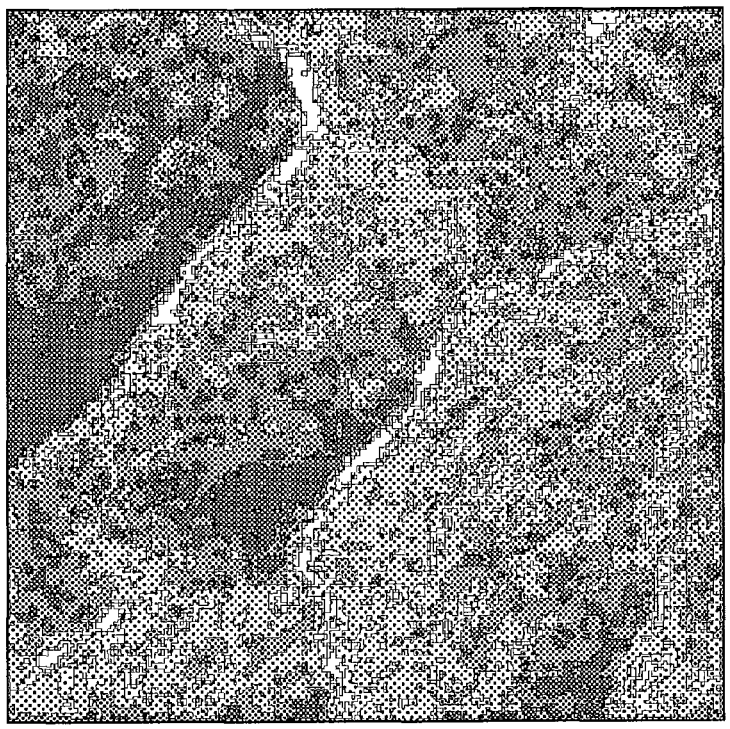
Figure 9D:
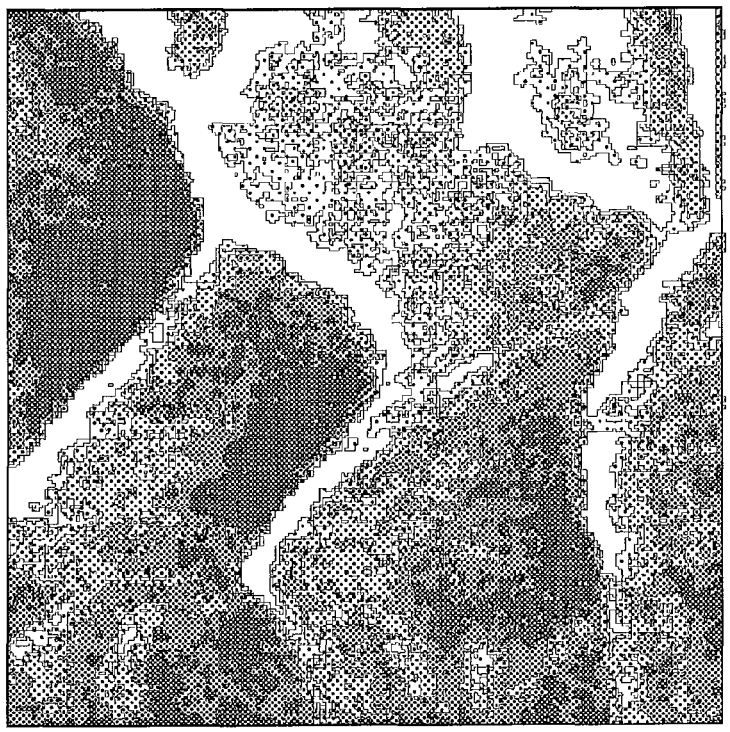
Figure 10:
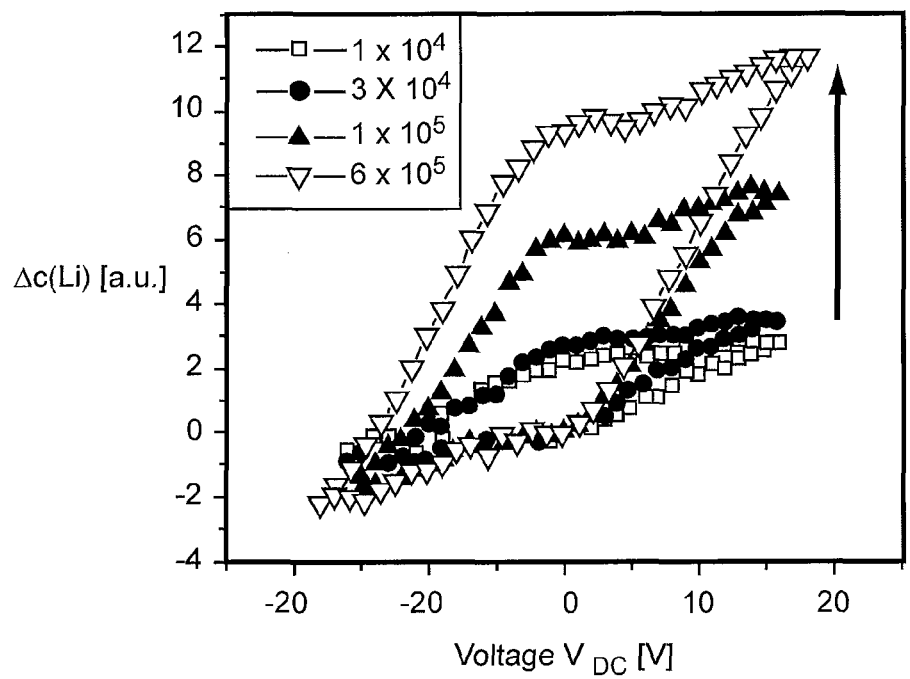
FIG. 10 is a plot of displacement hysteresis corresponding to the spatial maps of FIGS. 9A-9D.

FIGS. 9A-9D show the evolution of the loop opening in the same area for repeated sinusoidal cycles of $1 \times 10^4$, $3 \times 10^4$, $1 \times 10^5$, and $6 \times 10^5$ cycles, respectively. The hot spots visible in FIG. 9A continuously disappear, while, as shown in FIGS. 9B-C, the Li-ion flow at boundary-like features strongly increases. This shows that the Li-ions saturate the low density channels first, followed by sideways diffusion, resulting in broader features in the map shown in FIG. 9D. FIG. 10 shows the evolution of the hysteretic ESM loops for the boundary regions with increasing cycle number. Note that the sequence of images in FIGS. 9A-9D provides a direct nanoscale view in the Li ion flow in the Si anode on a nanoscale surface volume, and the Li ion evolution with the charge state as further described below.

Figure 11:
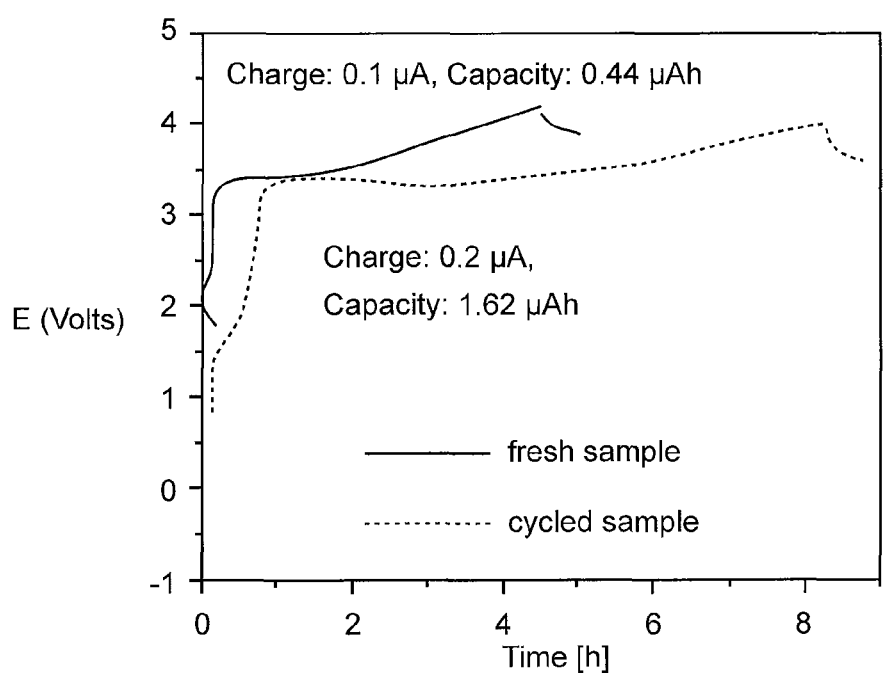
FIG. 11 is a plot of charge curves for a pristine sample and a cycled sample of FIG. 3C.

To establish the origin of the observed changes in the ESM signal of the battery test structure during high-frequency cycling, charge curves were measured for sample 16 in a pristine condition and for sample 16 in a strongly cycled condition using a constant current of 0.2 and 0.1 µA, respectively. Fresh sample and cycled sample charge curves are shown in FIG. 11. For both of these batteries, the Si was coated with a thin Cr current collector prior to electrochemical characterization. Before charging, the open circuit voltages of the pristine and cycled sample were both near zero as would be expected for an uncharged pristine Si—$LiCoO_2$ battery. The fresh sample was charged up to 4 V and the capacity of the battery can be extracted to 1.62 µAh, which is somewhat above the theoretical calculated capacity of 1.16 µAh, estimated for extraction of half of the lithium, to $Li_{0.5}CoO_2$. The cycled sample, (also shown in FIG. 9D), was charged up to 4.2V, but showed a strongly reduced capacity of only 0.44 µAh compared to the theoretical one of 1.07 mAh.

These results suggest that high-frequency, high-voltage cycling partially charges the battery. Further battery cycling following the results of FIG. 11 is almost irreversible: only a fraction of the capacity is detected on the subsequent discharge curve. This irreversible capacity loss is well-known problem for Si-anode materials, and could be related to the local Li-ion transport through the Si grain boundary-like feature.

While various embodiments of the invention have been described, it will be apparent to those of ordinary skill in the art that many more embodiments and implementations are possible within the scope of the invention. For example, those skilled in the art will recognize that nanoindentation is another method that can be used measurement of volumetric changes in a material. In this technique, an indenter having a pyramid geometry is employed and the area of the indent is determined using the known geometry of the indentation tip. Various parameters, such as load and depth of penetration are measured and a load-displacement curve is used to determine the mechanical properties of the material. Accordingly, the invention is not restricted except in light of the attached claims and their equivalents.

The invention claimed is:

1. A method of mapping activity on an electrochemically active surface of a material comprising:
    applying an electrical excitation signal to the material;
    inducing movement of mobile ions of the material in response to the electrical excitation signal; and
    measuring an electrochemical strain response induced by the movement of the mobile ions.

2. The method of claim 1, wherein the material comprises an ionic conductor or a mixed electronic-ionic conductor.

3. The method of claim 2, wherein applying an electrical excitation signal comprises forming electrodes in contact with the material and applying a voltage bias to the electrodes.

4. The method of claim 3, wherein applying an electrical excitation signal comprises applying a high frequency pulse at a frequency greater than a pixel acquisition time, and comprising one of a single or multiple frequency excitation in a predetermined frequency band, that can optionally include a frequency feedback to maintain mechanical resonance conditions.

5. The method of claim 3, wherein measuring an electrochemical strain response ions comprises contacting the material with an SPM tip and obtaining a topographical image of the material.

6. The method of claim 5, wherein measuring an electrochemical strain response comprises determining a volumetric change in the material from the SPM image.

7. The method of claim 5, wherein measuring an electrochemical strain response of the material comprises measuring the amplitude of bias-induced surface displacement oscillations of the material including vertical and lateral displacement components.

8. The method of claim 1, wherein applying an electrical excitation signal comprises contacting the material with an electrically biased scanning probe tip and producing a periodic electric field in a nanoscale volume of the material.

9. The method of claim 8, wherein applying an electrical excitation signal comprises applying a high frequency AC voltage.

10. The method of claim 9, wherein applying a high frequency AC voltage comprises applying an pulsed AC voltage a frequency of about 1 kHz to about 10 MHz.

11. The method of claim 8, wherein applying an electrical excitation signal comprises applying a DC voltage or a low frequency electrical bias, or both.

12. The method of claim 8, wherein measuring an electrochemical strain response comprises measuring strain in the material and obtaining a topographical image of a nanoscale volume of the material using the scanning probe tip.

13. The method of claim 1, wherein measuring an electrochemical strain response comprises detecting movement of anions arising from one or both of reaction or transport.

14. The method of claim 13, wherein measuring an electrochemical strain response comprises detecting movement of Li ions of Na ions.

15. The method of claim 14, wherein measuring an electrochemical strain response comprises detecting lattice strain induced by the intercalation of Li ions in a crystalline lattice of $LiCoO_2$.

16. The method of claim 1, wherein measuring an electrochemical strain response comprises detecting movement of cations arising from one or both of reaction or transport.

17. The method of claim 16, wherein measuring an electrochemical strain response comprises detecting movement of oxygen ions, fluorine ions, or hydroxyl ions.

18. The method of claim 17, wherein measuring an electrochemical strain response comprises detecting movement of oxygen ions, fluorine ions, or hydroxyl ions.in an oxide material.

19. The method of claim 17, wherein measuring an electrochemical strain response comprises detecting lattice strain induced by the evolution of oxygen ions in an oxygen-conductive fuel cell material.

20. The method of claim 1, wherein measuring an electrochemical strain response comprises contacting the material with an SPM tip coated with a solid electrolyte that is sensitive to a specific mobile ion.

21. The method of claim 1, wherein measuring an electrochemical strain response comprises contacting a surface of the material with an SPM tip and determining displacement of the surface by detecting movement of the SPM tip.

22. A method of mapping activity on an electrochemically active surface of a battery or fuel cell material comprising:
    contacting a nanoscale surface region of the material with an SPM tip;
    applying a pulsed electrical excitation signal to a nanoscale volume of the material to induce movement of mobile ions in the nanoscale volume of the material,
    wherein the movement of the mobile ions causes lattice strain in the material and one or both of a vertical and lateral displacement of a nanoscale surface region of the material;
    measuring the vertical or lateral displacement of the tip; and measuring electrochemical mobile ion transport characteristics of the battery material.

23. The method of claim 22, wherein applying a pulsed electrical excitation signal comprises applying the signal at a pulse rate greater than the diffusion time of the mobile ion motion in the battery material.

24. The method of claim 22, wherein applying a pulsed electrical excitation signal comprises voltage spectroscopy including applying a triangular voltage where a slow component of ion motion is swept having a period comparable to ionic diffusion time characteristic of the mobile ion followed by a detecting high frequency response.

25. The method of claim 22, wherein inducing movement of mobile ions comprises inducing movement of anions.

26. The method of claim 25, wherein inducing movement of mobile ions comprises inducing movement of oxygen ions, fluorine ions, or hydroxyl ions.

27. The method of claim 22, wherein inducing movement of mobile ions comprises inducing movement of cations.

28. The method of claim 27, wherein inducing movement of mobile ions comprises inducing movement of Li ions or Na ions.

29. The method of claim 22, wherein applying a pulsed electrical excitation signal comprises applying complex spectroscopy using first order reversal curves and detecting relaxation times within hysteresis loops to determine a contributions from kinetic and voltage effects of ionic motion induced in the specimen.

30. The method of claim 22, wherein applying a pulsed electrical excitation signal comprises applying AC voltages of varying frequency.

31. The method of claim 22, wherein applying a pulsed electrical excitation signal to a nanoscale volume of the material comprises applying the excitation signal to a surface region having a lateral distance of about 2 nm to about 100 nm.

32. The method of claim 22, wherein the vertical displacement of a nanoscale surface region of the material is at least about one picometer.

33. The method of claim 22, wherein measuring the vertical or lateral displacement comprises measuring a resonant frequency induced by the pulsed electrical excitation signal.

34. An apparatus that maps activity on an electrochemically active surface of a material comprising:
 a controller module configured to generate excitation signals, the excitation signals applied to a nanoscale surface region of the material;
 a probe in contact with the surface of the material, the probe configured to detect intercalation of mobile ions through a vertical displacement of the nanoscale surface region of the material; and
 a detector coupled to the probe that measures an electromechanical response at the nanoscale surface region of the material based on the displacement of the mobile ions.

35. The apparatus of claim 34, wherein the material comprises an ionic conductor or a mixed electronic-ionic conductor.

36. The apparatus of claim 35, wherein the electrochemically active surface comprises the surface of a thin-film battery, a solid fuel cell, or an electrochemical device having electrode contacts.

37. The apparatus of claim 34, wherein the probe comprises an SPM probe and wherein the probe produces a topographical image of nanoscale surface region.

38. The apparatus of claim 37, wherein a detector coupled to the probe produces a spectroscopic image over a period of time related to a pulse rate of the excitation signals produced by the controller module.

39. The apparatus of claim 34, wherein controller module applies a pulsed voltage to the nanoscale surface region of the material by means of the probe.

40. The apparatus of claim 34, wherein controller module applies a pulsed voltage to electrodes in electrical contact with the material.

* * * * *